(12) United States Patent
Zhang et al.

(10) Patent No.: US 11,934,605 B1
(45) Date of Patent: Mar. 19, 2024

(54) TOUCH PANEL AND TOUCH DISPLAY PANEL

(71) Applicants: Chengdu BOE Optoelectronics Technology Co., Ltd., Chengdu (CN); BOE TECHNOLOGY GROUP CO., LTD., Beijing (CN)

(72) Inventors: Guiyu Zhang, Beijing (CN); Hongqiang Luo, Beijing (CN); KwangGyun Jang, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/781,421

(22) PCT Filed: Jul. 12, 2021

(86) PCT No.: PCT/CN2021/105641
§ 371 (c)(1),
(2) Date: Oct. 20, 2022

(87) PCT Pub. No.: WO2022/037314
PCT Pub. Date: Feb. 24, 2022

(30) Foreign Application Priority Data

Aug. 18, 2020 (CN) .......................... 202010830601.0

(51) Int. Cl.
*G06F 3/044* (2006.01)
*G06F 3/041* (2006.01)

(52) U.S. Cl.
CPC ........ *G06F 3/04164* (2019.05); *G06F 3/0412* (2013.01); *G06F 3/0446* (2019.05); *G06F 2203/04111* (2013.01)

(58) Field of Classification Search
CPC .. G06F 3/04164; G06F 3/0446; G06F 3/0412; G06F 2203/04111
See application file for complete search history.

(56) References Cited

U.S. PATENT DOCUMENTS 10,509,494 B2  12/2019  Chen
11,385,750 B2   7/2022  Zhang et al.
(Continued)

FOREIGN PATENT DOCUMENTS

CN   105912164 A   8/2016
CN   106648240 A   5/2017
(Continued)

OTHER PUBLICATIONS

International Search Report in PCT/CN2021/105641 dated Oct. 13, 2021 in English.

*Primary Examiner* — Deeprose Subedi
(74) *Attorney, Agent, or Firm* — Collard & Roe, P.C.; William Collard

(57) ABSTRACT

A touch panel and a touch display panel are provided. The touch panel includes a base substrate, a first touch sub-electrode, a second touch sub-electrode, and a bridge. The bridge includes a first sub-bridge and a second sub-bridge. The first sub-bridge has a first edge and a second edge, the first edge includes a first linear sub-edge and a second linear sub-edge directly connected to each other, and the second edge includes a third linear sub-edge and a fourth linear sub-edge directly connected to each other. An included angle between the first linear sub-edge and the second linear sub-edge is a first included angle α1, an included angle between the third linear sub-edge and the fourth linear sub-edge is a second included angle α2, and at least one of the first included angle α1 and the second included angle α2 is an obtuse angle.

20 Claims, 7 Drawing Sheets

(56) References Cited

U.S. PATENT DOCUMENTS

| 11,416,094 | B2 | 8/2022 | Kim et al. | |
|---|---|---|---|---|
| 2015/0277627 | A1 | 10/2015 | Pang et al. | |
| 2020/0064968 | A1 | 2/2020 | Kim et al. | |
| 2021/0117047 | A1* | 4/2021 | Cho | G06F 3/0446 |
| 2021/0141477 | A1* | 5/2021 | Yang | G06F 3/0412 |
| 2021/0232242 | A1 | 7/2021 | Kim et al. | |
| 2021/0373712 | A1 | 12/2021 | Kim et al. | |

FOREIGN PATENT DOCUMENTS

| CN | 106887405 | A | 6/2017 |
|---|---|---|---|
| CN | 107632740 | A | 1/2018 |
| CN | 110308811 | A | 10/2019 |
| CN | 110456936 | A | 11/2019 |
| CN | 110688025 | A | 1/2020 |

\* cited by examiner

TOUCH PANEL AND TOUCH DISPLAY PANEL

CROSS REFERENCE TO RELATED APPLICATIONS

This application is a U.S. National Phase Entry of International Application No. PCT/CN2021/105641 filed on Jul. 12, 2021, designating the United States of America and claiming priority to Chinese Patent Application No. 202010830601.0 filed on Aug. 18, 2020. The present application claims priority to and the benefit of the above-identified applications and the above-identified applications are incorporated by reference herein in their entirety.

TECHNICAL FIELD

Embodiments of the present disclosure relate to a touch panel and a touch display panel.

BACKGROUND

With the increasing demand for human-computer interaction, the market demand for touch screen is also increasing. At present, human beings are highly dependent on mobile touch devices, especially mobile phones and tablet computers. The development of mobile phones has also experienced some stages, from the earliest feature phones to resistive touch mobile phones with poor touch experience, and further developed into capacitive touch mobile phones with excellent touch experience. With the continuous improvement of human experience of touch mobile phones, people also began to pay attention to the display effect and characteristic requirement of mobile phones, which requires touch screen manufacturers to consider these needs when producing mobile phones.

SUMMARY

At least one embodiment of the present disclosure provides a touch panel, comprising: a base substrate, having a main surface; a first touch sub-electrode, a connector and a second touch sub-electrode sequentially arranged on the main surface along a first direction, wherein the connector is electrically connected to the first touch sub-electrode and the second touch sub-electrode; and a third touch sub-electrode, a fourth touch sub-electrode and a bridge all on the main surface, wherein the third touch sub-electrode and the fourth touch sub-electrode are located on opposite sides of the connector in a second direction intersecting the first direction; the bridge and the connector are partially overlapped with each other and insulated from each other, the bridge is electrically connected to the third touch sub-electrode and the fourth touch sub-electrode, the bridge comprises a first sub-bridge and a second sub-bridge, and each of the first sub-bridge and the second sub-bridge is electrically connected to the third touch sub-electrode and the fourth touch sub-electrode, wherein in a plane structure of the touch panel parallel to the main surface, the first sub-bridge has a first edge and a second edge opposite to and spaced apart from each other, the first edge comprises a first linear sub-edge and a second linear sub-edge directly connected to each other, the second edge comprises a third linear sub-edge and a fourth linear sub-edge directly connected to each other, the first linear sub-edge and the third linear sub-edge are partially overlapped with the third touch sub-electrode, the second linear sub-edge and the fourth linear sub-edge are partially overlapped with the fourth touch sub-electrode, an included angle between the first linear sub-edge and the second linear sub-edge is a first included angle $\alpha 1$, an included angle between the third linear sub-edge and the fourth linear sub-edge is a second included angle $\alpha 2$, and at least one of the first included angle $\alpha 1$ and the second included angle $\alpha 2$ is an obtuse angle.

In an example, the first included angle $\alpha 1$ and the second included angle $\alpha 2$ are in a range of greater than or equal to 90° and less than 160°.

In an example, each of the first linear sub-edge, the second linear sub-edge, the third linear sub-edge and the fourth linear sub-edge is neither parallel nor perpendicular to the first direction and the second direction.

In an example, the third touch sub-electrode has a third edge facing the connector; each of the first sub-bridge and the second sub-bridge is partially overlapped with the third edge, and the third edge comprises a first inflection point, a second inflection point, and a fifth linear sub-edge connected to the first inflection point and a sixth linear sub-edge connected to the second inflection point, wherein the fifth linear sub-edge is not parallel to the sixth linear sub-edge.

In an example, the first linear sub-edge and the third linear sub-edge of the first sub-bridge intersect the third edge, and on the third edge, the third linear sub-edge is farther away from the first inflection point than the first linear sub-edge.

In an example, the first linear sub-edge is overlapped with the first inflection point.

In an example, on the third edge, the first sub-bridge and the second sub-bridge are partially overlapped with the third edge between the first inflection point and the second inflection point.

In an example, the third edge further comprises a third inflection point, on the third edge, the third inflection point is located between the first inflection point and the second inflection point, the first sub-bridge is overlapped with the third edge between the first inflection point and the third inflection point, and the second sub-bridge is overlapped with the third edge between the second inflection point and the third inflection point; and in the second direction, the third inflection point is farther away from the fourth touch sub-electrode than the first inflection point and the second inflection point.

In an example, a distance from the first inflection point to the third linear sub-edge is less than a distance from the third inflection point to the third linear sub-edge.

In an example, the first sub-bridge is partially overlapped with the third edge on a side of the first inflection point away from the second inflection point, and the second sub-bridge is partially overlapped with the third edge on a side of the second inflection point away from the first inflection point.

In an example, in the plane structure, the first sub-bridge intersects the fifth linear sub-edge, the second sub-bridge intersects the sixth linear sub-edge, and a third included angle $\alpha 3$ between the first linear sub-edge and the fifth linear sub-edge and a fourth included angle $\alpha 4$ between the third linear sub-edge and the fifth linear sub-edge are in a range of greater than or equal to 70° and less than 110°.

In an example, both the third included angle $\alpha 3$ and the fourth included angle $\alpha 4$ are 90°.

In an example, the fifth linear sub-edge and the sixth linear sub-edge intersect at a third inflection point between the first inflection point and the second inflection point, the fifth linear sub-edge is connected to the first inflection point and the third inflection point, the sixth linear sub-edge is connected to the second inflection point and the third inflection point, the first linear sub-edge and the third linear sub-edge intersect the fifth linear sub-edge, and in the second direction, the third inflection point is farther away from the fourth touch sub-electrode than the first inflection point and the second inflection point.

In an example, a fifth included angle α5 between the fifth linear sub-edge and the sixth linear sub-edge is in a range of greater than or equal to 130° and less than 180°.

In an example, a sixth included angle α6 between the fifth linear sub-edge and the first direction is in a range of greater than 0° and less than or equal to 25°.

In an example, on the third edge, the fifth linear sub-edge is located on a side of the first inflection point away from the second inflection point, and the sixth linear sub-edge is located on a side of the second inflection point away from the first inflection point.

In an example, the first sub-bridge has a shape protruding towards the second sub-bridge, and the second sub-bridge has a shape protruding towards the first sub-bridge.

In an example, the first sub-bridge has a shape protruding away from the second sub-bridge, and the second sub-bridge has a shape protruding away from the first sub-bridge.

In an example, the first linear sub-edge is parallel to the third linear sub-edge, the second linear sub-edge is parallel to the fourth linear sub-edge, and the first included angle α1 is equal to the second included angle α2.

In an example, the first included angle α1 is less than the second included angle α2.

In an example, in the plane structure, shapes and sizes of the first sub-bridge and the second sub-bridge are the same.

In an example, an axis of symmetry of the first sub-bridge is a first axis, an axis of symmetry of the second sub-bridge is a second axis, and the first axis and the second axis are parallel to the first direction.

In an example, the first axis coincides with the second axis.

In an example, the first sub-bridge and the second sub-bridge are symmetrical with respect to a third axis, and the third axis is parallel to the second direction.

In an example, in the plane structure, the fourth touch sub-electrode has a fourth edge facing the connector, the third edge and the fourth edge are symmetrical with respect to a first axis, and the first axis is parallel to the first direction.

In an example, in the plane structure, the fifth linear sub-edge and the sixth linear sub-edge are symmetrical with respect to a third axis, and the third axis is parallel to the second direction.

In an example, a seventh edge of the first sub-bridge is connected to the first linear sub-edge and the third linear sub-edge, the seventh edge is perpendicular to the first linear sub-edge and the third linear sub-edge, and a length s1 of the first linear sub-edge, a length f of the seventh edge, a sixth included angle α6 between the fifth linear sub-edge and the first direction, a maximum length b of the first sub-bridge in the second direction, and the second included angle α2 satisfy: $s1/f \cdot \tan \alpha 6 = (b/2)/\sin(\alpha 2/2)$.

In an example, the length f of the seventh edge is in a range of greater than or equal to 30 μm and less than or equal to 60 μm.

In an example, a ratio of a maximum length b of the first sub-bridge in the second direction to a minimum length a of the connector in the second direction is between 2.75 and 3.25.

In an example, b=3a.

In an example, the touch panel further comprises a conductive via electrically connected to the first sub-bridge and the third touch sub-electrode, in the plane structure, a shape of the conductive via is a rectangle, and the connector has a fifth edge facing the third touch sub-electrode and a sixth edge facing the fourth touch sub-electrode, wherein the fifth edge comprises a seventh linear sub-edge parallel to the fifth linear sub-edge, a seventh edge of the first sub-bridge is connected to the first linear sub-edge and the third linear sub-edge, and a distance c between the fifth linear sub-edge and the seventh linear sub-edge, a distance h between the seventh edge and the fifth linear sub-edge and a length d of either side of the rectangle satisfy: d≤c+h≤2d.

In an example, the distance c between the fifth linear sub-edge and the seventh linear sub-edge is less than or equal to 20 μm.

In an example, the length d of either side of the rectangle is in a range of greater than or equal to 20 μm and less than or equal to 40 μm.

In an example, a first linear side of the conductive via facing the connector is parallel to the fifth linear sub-edge of the third touch sub-electrode, and a distance e between the first linear side and the fifth linear sub-edge is in a range of greater than or equal to 5 μm and less than or equal to 10 μm.

In an example, in the plane structure, the seventh edge is overlapped with the third touch sub-electrode, a second linear side of the conductive via away from the connector is parallel to the seventh edge, and a distance g between the second linear side and the seventh edge is in a range of greater than or equal to 5 μm and less than or equal to 10 μm.

In an example, the distance h between the seventh edge and the fifth linear sub-edge is in a range of greater than or equal to 30 μm and less than or equal to 60 μm.

In an example, in the plane structure, a diagonal of a part of the first sub-bridge overlapping with the third touch sub-electrode coincides with or is parallel to a diagonal of the conductive via.

In an example, the touch panel further comprises two parallel strip-shaped auxiliary electrodes between each adjacent two of the first touch sub-electrode, the second touch sub-electrode, the third touch sub-electrode and the fourth touch sub-electrode.

In an example, the first touch sub-electrode, the second touch sub-electrode, the third touch sub-electrode, the fourth touch sub-electrode and the connector are disposed in a same layer.

In an example, the first touch sub-electrode, the second touch sub-electrode and the connector are formed as an integral.

At least one embodiment of the present disclosure provides a touch display panel, comprising a display panel and the touch panel according to any embodiment of the present disclosure, wherein the display panel is located on a side of the base substrate opposite to the main surface.

In an example, the base substrate in the touch panel is an encapsulation layer in the display panel.

In an example, the display panel comprises a plurality of display pixel units arranged in a matrix in the first direction and the second direction, each of the plurality of display pixel units comprises sub-pixels for displaying different colors, and a linear edge of any one of the sub-pixels is neither parallel nor perpendicular to linear parts of edges of the first sub-bridge and the second sub-bridge.

DETAILED DESCRIPTION

Figure 1:
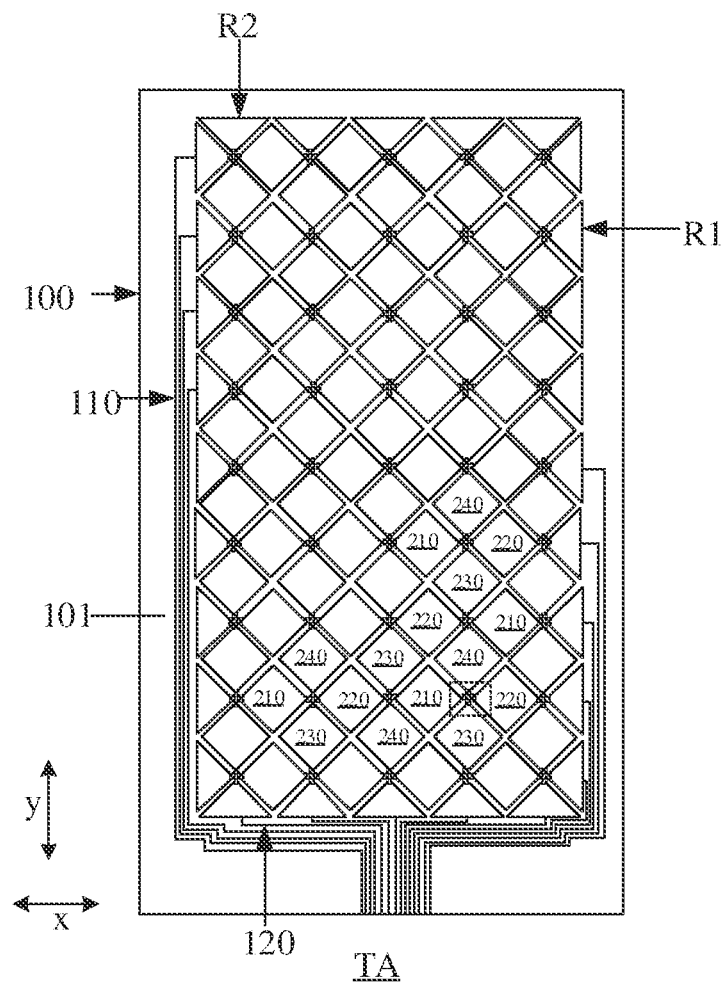
FIG. 1 is a schematic view of a plane structure of a touch panel provided by the embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly. The term "plurality" refers to two or more, unless expressly limited otherwise.

It should be noted that, in the drawings, the sizes of layers and regions may be exaggerated for clarity of illustration. It can also be understood that when an element or a layer is referred to as being "on" another element or layer, it can be directly on the other element, or intervening layers may be present. In addition, it can be understood that when an element or a layer is referred to as being "under" another element or layer, it can be directly under the other element, or more than one intervening layer or element may be present. In addition, it can also be understood that when a layer or an element is referred to as being "between" two layers or elements, the layer or the element can be the only layer or element between the two layers or elements, or more than one intervening layer or element may also be present. Like reference numerals indicate like elements throughout.

The embodiment of the present disclosure provides a touch panel including a base substrate which has a main surface, and a first touch sub-electrode, a connector and a second touch sub-electrode sequentially arranged on the main surface along a first direction. The connector is electrically connected to the first touch sub-electrode and the second touch sub-electrode. The touch panel farther includes a third touch sub-electrode, a fourth touch sub-electrode and a bridge all on the main surface. The third touch sub-electrode and the fourth touch sub-electrode are located on opposite sides of the connector in a second direction intersecting the first direction. The bridge and the connector are partially overlapped with each other and insulated from each other, the bridge is electrically connected to the third touch sub-electrode and the fourth touch sub-electrode, the bridge includes a first sub-bridge and a second sub-bridge, and each of the first sub-bridge and the second sub-bridge is electrically connected to the third touch sub-electrode and the fourth touch sub-electrode. In a plane structure of the touch panel parallel to the main surface, the first sub-bridge has a first edge and a second edge opposite to and spaced apart from each other, the first edge includes a first linear sub-edge and a second linear sub-edge directly connected to each other, and the second edge includes a third linear sub-edge and a fourth linear sub-edge directly connected to each other. The first linear sub-edge and the third linear sub-edge are partially overlapped with the third touch sub-electrode, the second linear sub-edge and the fourth linear sub-edge are partially overlapped with the fourth touch sub-electrode, an included angle between the first linear sub-edge and the second linear sub-edge is a first included angle, an included angle between the third linear sub-edge and the fourth linear sub-edge is a second included angle, and at least one of the first included angle and the second included angle is an obtuse angle.

In the above embodiment of the present disclosure, because the sub-edge of the first sub-bridge is designed to form a broken line with obtuse angle, compared to a sub-bridge with a rectangular plane shape, at least the optical interference of the edge of the first sub-bridge is reduced, thereby reducing or eliminating the visual visibility problem of the first sub-bridge.

Figure 2:
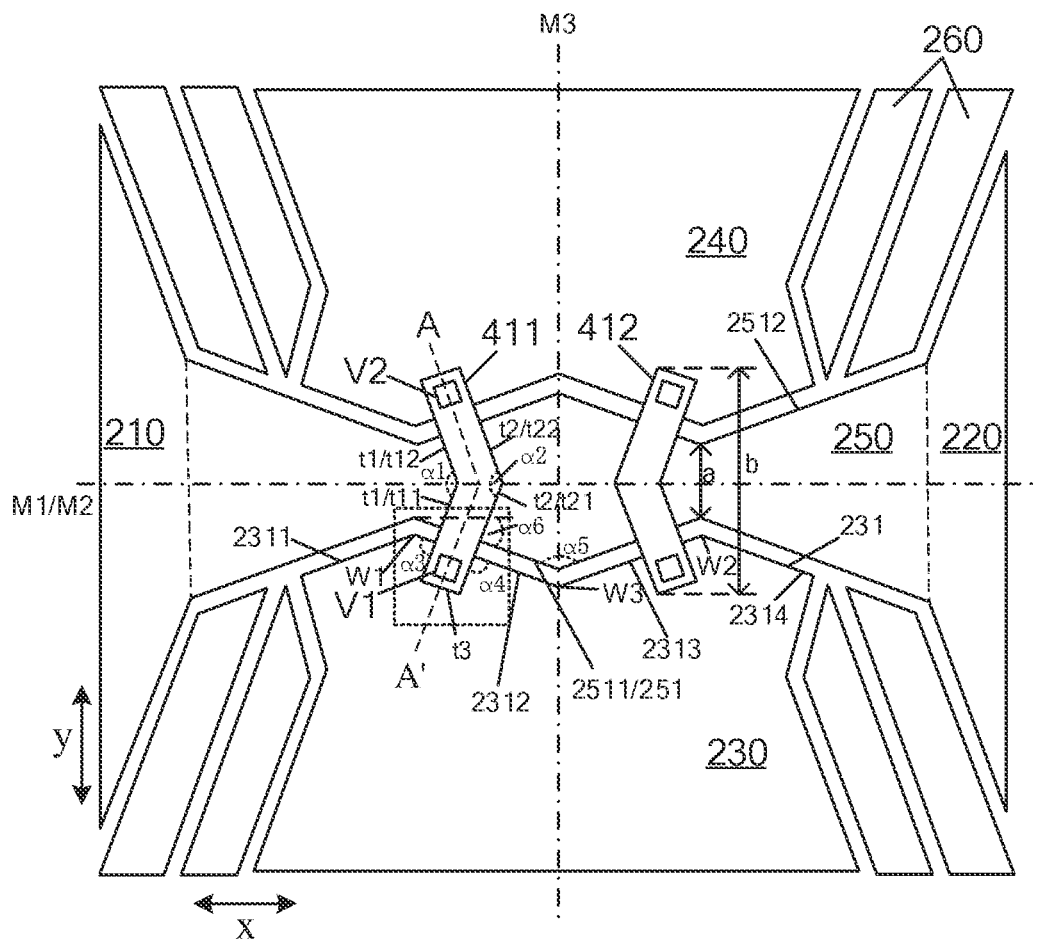
FIG. 2 is a schematic view of an enlarged plane structure at the dotted box in FIG. 1 of an example of a touch panel provided by the embodiments of the present disclosure.
Figure 3:
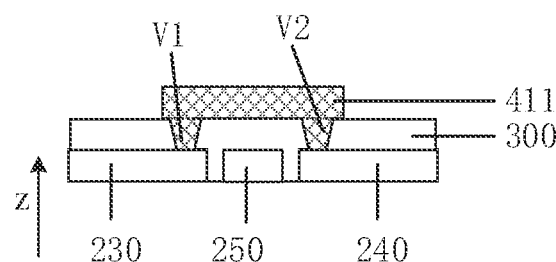
FIG. 3 is a schematic view of a cross-sectional structure taken along the dotted line AA' in FIG. 2 of the touch panel provided by the embodiments of the present disclosure.

FIG. 1 is a schematic view of a plane structure of a touch panel provided by the embodiments of the present disclosure. FIG. 2 is a schematic view illustrating an enlarged plane structure at the dotted box in FIG. 1 of the touch panel provided by the embodiments of the present disclosure. FIG. 3 is a schematic view illustrating a cross-sectional structure taken along the dotted line AA' in FIG. 2 of the touch panel provided by the embodiments of the present disclosure.

As shown in FIG. 1, the touch panel TA includes a base substrate 100 having a main surface 101, and a plurality of first touch electrodes R1 and a plurality of second touch electrodes R2 on the main surface 101. The touch panel TA may be a mutual capacitance touch panel. Here, the base substrate 100 is, for example, polyethylene terephthalate (PET), Chip on PI (COP), or transparent polyimide (CPI).

Each first touch electrode R1 extends along a first direction x, and the plurality of first touch electrodes R1 are arranged along a second direction y. The included angle between the first direction x and the second direction y is greater than zero. In FIG. 1, as an example, the included angle between the first direction x and the second direction y is 90 degrees. Of course, the included angle may also be other degrees greater than zero. Each first touch electrode R1 includes a plurality of first touch sub-electrodes 210 and a plurality of second touch sub-electrodes 220 alternately arranged in the first direction, and a plurality of connectors 250, and each of the plurality of connectors 250 is electrically connected to a first touch sub-electrode 210 and a second touch sub-electrode 220 adjacent to the each connector.

Each second touch electrode R2 extends along the second direction y intersecting the first direction x, and the plurality of second touch electrodes R2 are arranged along the first direction x. Each second touch electrode R2 includes a plurality of third touch sub-electrodes 230 and a plurality of fourth touch sub-electrodes 240 alternately arranged on the second direction y, and a plurality of bridges 410, and each of the plurality of bridges 410 is electrically connected to a third touch sub-electrode 230 and a fourth touch sub-electrode 240 adjacent to the each bridge.

The plurality of first touch electrodes R1 and the plurality of second touch electrodes R2 are electrically insulated from each other and intersect at a plurality of cross positions. The plurality of connectors 250 of the plurality of first touch electrodes R1 and the plurality of bridges 410 of the plurality of second touch electrodes R2 are partially overlapped with each other at the plurality of cross positions in a one-to-one correspondence.

The bridge 410 includes a first sub-bridge 411 and a second sub-bridge 412. Each of the first sub-bridge 411 and the second sub-bridge 412 is electrically connected to a third touch sub-electrode 230 and a fourth touch sub-electrode 240 adjacent thereto.

All of the plurality of first touch sub-electrodes 210, the plurality of second touch sub-electrodes 220, the plurality of third touch sub-electrodes 230, the plurality of fourth touch sub-electrodes 240 and the plurality of connectors 250 are, for example, located in a first conductive layer. The plurality of first touch sub-electrodes 210, the plurality of second touch sub-electrodes 220, the plurality of third touch sub-electrodes 230, the plurality of fourth touch sub-electrodes 240 and the plurality of connectors 250 are formed, for example, by performing a patterning process on a same conductive film layer. The patterning process includes, for example, coating a photoresist layer on a conductive film to be patterned, performing exposure and development on the photoresist layer to form a photoresist pattern and etching the conductive film to be patterned using the photoresist pattern as a mask, thereby forming a patterned conductive structure.

On the main surface 101, the plurality of first touch sub-electrodes 210, the plurality of connectors 250 and the plurality of second touch sub-electrodes 220 are arranged along the first direction x. The connector 250 is electrically connected to a first touch sub-electrode 210 and a second touch sub-electrode 220 which are adjacent to the connector 250. The connector 250 has, for example, a strip shape extending in the first direction x. In FIG. 2, the boundary of the connector 250 in the first direction is schematically represented by two dotted lines. In the present embodiment, the connector 250, the first touch sub-electrode 210 and the second touch sub-electrode 220 may be formed as an integral structure. That is, there may be no interface between the connector 250 and the first touch sub-electrode 210 and the second touch sub-electrode 220.

For a same connector 250, the first touch sub-electrode 210 and the second touch sub-electrode 220 are located on opposite sides of the connector 250 in the first direction x, and the third touch sub-electrode 230 and the fourth touch sub-electrode 240 are located on opposite sides of the connector 250 in the second direction y.

An insulating layer 300 is disposed on the first conductive layer. In the present embodiment, the insulating layer 300 basically and completely covers the first conductive layer, and conductive vias V1 and V2 are formed in the insulating layer 300.

A plurality of bridges 410 are located in a second conductive layer. Referring to FIG. 2 and FIG. 3, the opposite ends of each bridge 410 are electrically connected to the corresponding third touch sub-electrode 230 and fourth touch sub-electrode 240 through the conductive vias V1 and V2, respectively.

The first conductive layer, the insulating layer 300 and the second conductive layer are sequentially arranged in a third direction z away from the base substrate 100.

The embodiments of the present disclosure are not limited thereto. In another embodiment, the insulating layer 300 includes an insulating pad disposed across the connector 250 and between the third touch sub-electrode 230 and the fourth touch sub-electrode 240, and the opposite ends of the insulating pad are lapped on the third touch sub-electrode 230 and the fourth touch sub-electrode 240, respectively. The bridge 410 is disposed across the insulating pad, and the opposite ends of the bridge 410 are lapped on the third touch sub-electrode 230 and the fourth touch sub-electrode 240, respectively.

The touch panel TA further includes a plurality of first connecting lines 110 connected to the plurality of first touch electrodes R1 in a one-to-one correspondence, and a plurality of second connecting lines 120 connected to the plurality of second touch electrodes R2 in a one-to-one correspondence. Through the first connecting lines 110 and the second connecting lines 120, electrical signals can be applied to the touch electrodes connected to the connecting lines, and electrical signals on the touch electrodes can be acquired, so as to detect the touch position. As an example, when performing touch position detection, driving electrical signals can be applied to the plurality of second touch electrodes R2 through the plurality of second connecting lines 120, sequentially. After each time of applying a driving electrical signal to a second touch electrode R2, the induced electrical signals on the plurality of first touch electrodes R1 need to be acquired through the plurality of first connecting lines 110. When the driving electrical signal is applied to the second touch electrodes R2 in $p^{th}$ column, the induced electrical signal acquired from the first touch electrodes R1 in $q^{th}$ row is not a preset electrical signal, while the induced electrical signals acquired from the first touch electrodes R1 in other rows are all preset electrical signals, it can be determined that the cross position of the touch electrode in $p^{th}$ column and the touch electrode in $q^{th}$ row is the touch position. For example, $p \geq 1$, $q \geq 1$.

In the plane structure of the touch panel TA parallel to the main surface, referring to FIG. 2, each first sub-bridge 411 has a first edge t1 and a second edge t2 opposite to and spaced apart from each other. Two ends of each of the first edge t1 and the second edge t2 are overlapped with the third touch sub-electrode 230 and the fourth touch sub-electrode 240, respectively. The first edge t1 includes a first linear sub-edge t11 and a second linear sub-edge t12 directly connected to each other. The second edge t2 includes a third linear sub-edge t21 and a fourth linear sub-edge t22 directly connected to each other. The first linear sub-edge t11 and the third linear sub-edge t12 are partially overlapped with the third touch sub-electrode 230, and the second linear sub-edge t12 and the fourth linear sub-edge t22 are partially overlapped with the fourth touch sub-electrode 240. The included angle between the first linear sub-edge t11 and the second linear sub-edge t12 is the first included angle α1. The included angle between the third linear sub-edge t21 and the fourth linear sub-edge t22 is the second included angle α2. At least one of the first included angle α1 and the second included angle α2 is an obtuse angle.

It can be understood that, the term "linear sub-edge" in the present disclosure does not limit that the sub-edge must be an ideal straight line, but allows the sub-edge to have a certain straightness tolerance in a plane parallel to the main plane. That is, in the plane parallel to the main plane, all parts of the linear sub-edge are located in a region between two parallel lines, and the tolerance value of a distance between the two parallel lines is 1 μm. Two linear features being "parallel" in the present disclosure does not limit that the two linear features must be strictly parallel, but allows a certain deviation in the parallelism of the two linear features. For example, the included angle between two linear features parallel to each other is less than 2°. Two linear features being "perpendicular" in the present disclosure does not limit that the included angle between the two linear features must be strictly equal to 90°, but allows a certain deviation in the parallelism of the two linear features. For example, the included angle between two linear features perpendicular to each other is in the range of 88° to 92°.

In the above embodiment of the present disclosure, because at least one of the first included angle α) and the second included angle α2 is an obtuse angle, compared to the case where both the first included angle α1 and the second included angle α2 are 180°, the optical interference at the edge of the first sub-bridge is reduced, thereby reducing or eliminating the visual visibility problem of the first sub-bridge.

Preferably, both the first included angle α1 and the second included angle α2 are, for example, in the range of larger than 90° and less than or equal to 160°. Further, preferably, at least one of the first included angle α1 and the second included angle α2 is, for example, 140°. In this way, the optical interference of the edge of the first sub-bridge can be further reduced, thereby reducing or eliminating the visual visibility problem of the first sub-bridge.

For example, each of the first linear sub-edge t11, the second linear sub-edge t12, the third linear sub-edge t21 and the fourth linear sub-edge t22 is neither parallel nor perpendicular to the first direction x. Each of the first linear sub-edge t11, the second linear sub-edge t12, the third linear sub-edge t21 and the fourth linear sub-edge t22 is neither parallel nor perpendicular to the second direction y. That is, the first to fourth linear sub-edges are neither parallel nor perpendicular to the extension directions x and y of the first and second touch electrodes. In this way, the optical interference of the edge of the first sub-bridge can be further reduced, thereby reducing or eliminating the visual visibility problem of the first sub-bridge.

Still referring to FIG. 2, the third touch sub-electrode 230 has a third edge 231 facing the connector. Each of the first sub-bridge 411 and the second sub-bridge 412 is partially overlapped with the third edge 231. The third edge includes a linear sub-edge 2311, a linear sub-edge 2312, a linear sub-edge 2313, and a linear sub-edge 2314. The linear sub-edge 2311 and the linear sub-edge 2312 are connected to each other at a first inflection point W1, the linear sub-edge 2313 and the linear sub-edge 2314 are connected to each other at a second inflection point W2, and the linear sub-edge 2312 and the linear sub-edge 2313 are connected to each other at a third inflection point W3. In the second direction, the third inflection point W3 is farther away from the fourth touch sub-electrode 240 than the first inflection point W1 and the second inflection point W2.

In the example illustrated in FIG. 2 of the present embodiment, on the third edge 231, the first sub-bridge 411 and the second sub-bridge 412 are partially overlapped with the third edge 231 between the first inflection point W1 and the second inflection point W2.

The first linear sub-edge t11 and the third linear sub-edge t21 of the first sub-bridge 411 intersect the linear sub-edge 2312 (as an example of a fifth linear sub-edge) of the third edge 231. On the linear sub-edge 2312, the third linear sub-edge t21 is farther away from the first inflection point W1 than the first linear sub-edge t11.

The second sub-bridge 412 intersects the linear sub-edge 2313 (as an example of a sixth linear sub-edge) of the third edge 231.

That is, the first sub-bridge 411 is partially overlapped with the third edge 231 between the first inflection point W1 and the third inflection point W3, and the second sub-bridge 412 is partially overlapped with the third edge 231 between the second inflection point W2 and the third inflection point W3.

In the example illustrated in FIG. 2 of the present embodiment, the first sub-bridge 411 and the second sub-bridge 412 have the same plane shape and size. However, the embodiments of the present disclosure are not limited thereto. In another embodiment, the first sub-bridge 411 and the second sub-bridge 412 may have different plane shapes or sizes.

For example, the first sub-bridge 411 has a plane shape protruding towards the second sub-bridge 412, and the second sub-bridge 412 has a plane shape protruding towards the first sub-bridge 411.

Still referring to FIG. 2, the distance from the first inflection point W1 to the third linear sub-edge t21 is less than the distance from the third inflection point W3 to the third linear sub-edge t21. In this way, on the one hand, the maximum length b of the first sub-bridge 411 and the second sub-bridge 412 in the second direction y is reduced, thereby further reducing the visibility of the first sub-bridge 411 and the second sub-bridge 412. On the other hand, the shortest distance between the first sub-bridge 411 and the second sub-bridge 412 in the first direction is increased, such that the electromagnetic interference between the first sub-bridge 411 and the second sub-bridge 412 in the energized state is reduced.

Figure 4:
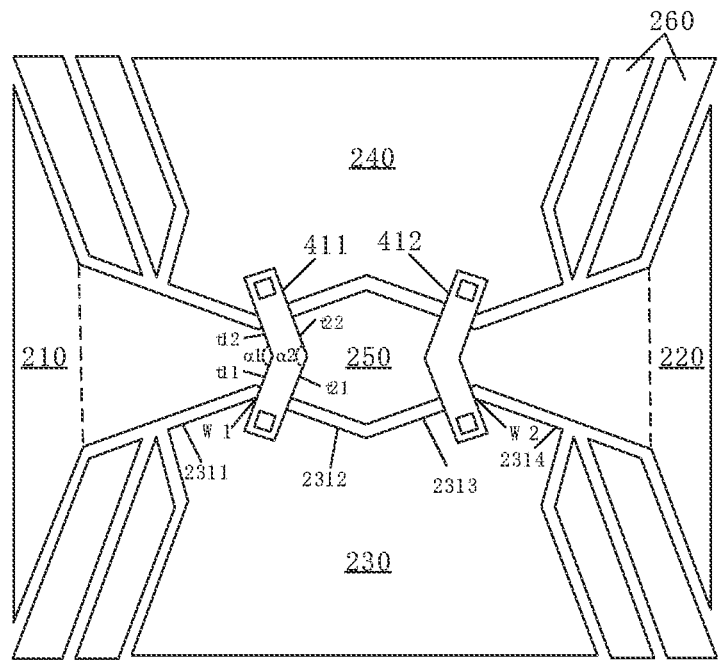
FIG. 4 is a schematic view of an enlarged plane structure at the dotted box in FIG. 1 of another example of a touch panel provided by the embodiments of the present disclosure.

FIG. 4 is a schematic view of an enlarged plane structure in the dotted box in FIG. 1 of another example of the touch panel provided by the embodiments of the present disclosure. Referring to FIG. 4, the first linear sub-edge t11 of the first sub-bridge 411 is overlapped with the first inflection point W1. Similarly, the corresponding linear sub-edge of the second sub-bridge 412 is overlapped with the second inflection point W2. In this way, the maximum length b of the first sub-bridge 411 and the second sub-bridge 412 in the second direction y is further reduced, thereby further reducing the visibility of the first sub-bridge 411 and the second sub-bridge 412.

Figure 5:
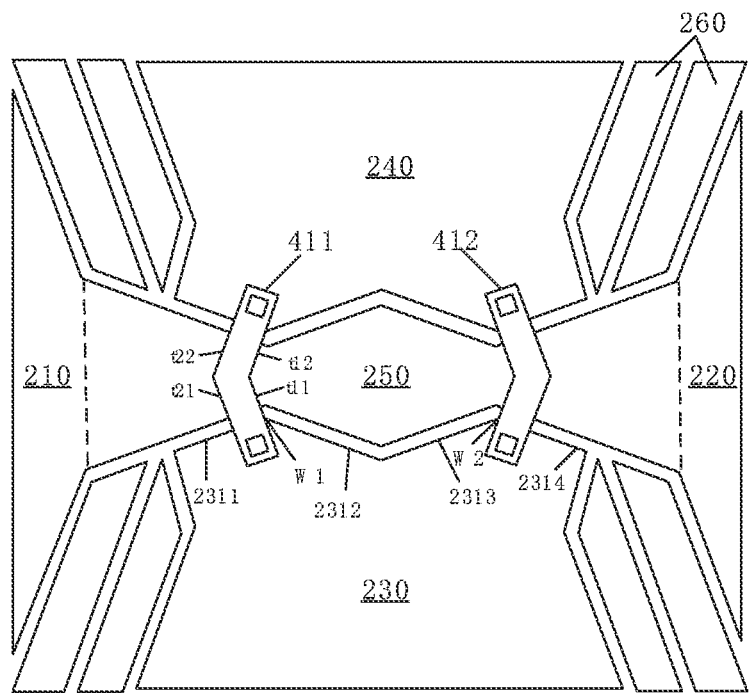
FIG. 5 is a schematic view of an enlarged plane structure at the dotted box in FIG. 1 of yet another example of a touch panel provided by the embodiments of the present disclosure.

The embodiments of the present disclosure do not limit the positions of the first sub-bridge 411 and the second sub-bridge 412 on the third edge 231 of the third touch sub-electrode 230. FIG. 5 is a schematic view of an enlarged plane structure at the dotted box in FIG. 1 of another example of the touch panel provided by the embodiments of the present disclosure. As shown in FIG. 5, the first sub-bridge 411 is partially overlapped with the third edge 231 on the side of the first inflection point W1 away from the second inflection point W2, and the second sub-bridge 412 is partially overlapped with the third edge 231 on the side of the second inflection point W2 away from the first inflection point W1.

Still referring to FIG. 5, the first linear sub-edge t11 and the third linear sub-edge t21 of the first sub-bridge 411 intersect the linear sub-edge 2311 (as an example of the fifth linear sub-edge) of the third edge 231. On the linear sub-edge 2311, the third linear sub-edge t21 is farther away from the first inflection point W1 than the first linear sub-edge t11. The second sub-bridge 412 intersects the linear sub-edge 2314 (as an example of the sixth straight sub-edge) of the third edge 231.

For example, in FIG. 5, the first linear sub-edge t11 of the first sub-bridge 411 may also be overlapped with the first inflection point W1. Similarly, the corresponding linear sub-edge of the second sub-bridge 412 may also be overlapped with the second inflection point W2. In this way, the maximum length b of the first sub-bridge 411 and the second sub-bridge 412 in the second direction y is further reduced, thereby further reducing the visibility of the first sub-bridge 411 and the second sub-bridge 412.

Because the shortest distance in the first direction between the first sub-bridge 411 and the second sub-bridge 412 in the example shown in FIG. 5 is larger compared to the shortest distance in the first direction between the first sub-bridge 411 and the second sub-bridge 412 in the example shown in FIG. 2 and FIG. 4, the electromagnetic interference between the first sub-bridge 411 and the second sub-bridge 412 in the energized state is further reduced.

Figure 6:
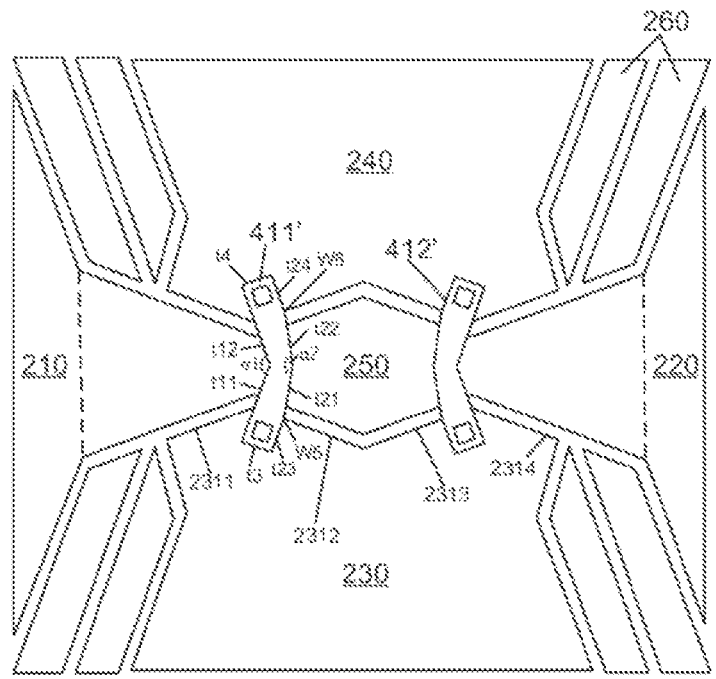
FIG. 6 is a schematic view of an enlarged plane structure at the dotted box in FIG. 1 of yet another example of a touch panel provided by the embodiments of the present disclosure.

FIG. 6 is a schematic view of an enlarged plane structure at the dotted box in FIG. 1 of another example of the touch panel provided by the embodiments of the present disclosure. The main difference between the example shown in FIG. 6 and the example shown in FIG. 4 lies in the shape of the second edge t2 of the first sub-bridge 411 and the relationship between the second included angle and the first included angle.

Referring to FIG. 4, the first linear sub-edge t11 of the first sub-bridge 411 is parallel to the third linear sub-edge t21, and the second linear sub-edge t12 is parallel to the fourth linear sub-edge t22. The first included angle α1 is equal to the second included angle α2.

Referring to FIG. 6, the second edge t2 of the first sub-bridge 411 further includes a linear sub-edge t23 and a linear sub-edge t24. The linear sub-edge t23 is connected to the third linear sub-edge t21 and forms an inflection point W5 on the side of the third linear sub-edge t21 opposite to the fourth linear sub-edge t22, and the linear sub-edge t24 is connected to the fourth linear sub-edge t22 and forms an inflection point W6 on the side of the fourth linear sub-edge t22 opposite to the third linear sub-edge t21. For example, the first linear sub-edge t11 of the first sub-bridge 411 is parallel to the linear sub-edge t23, and the second linear sub-edge t12 is parallel to the linear sub-edge t24.

In the example shown in FIG. 6, the first included angle α1 is less than the second included angle α2. Therefore, compared to the example shown in FIG. 4, in the example shown in FIG. 6, the shortest distance in the first direction between the first sub-bridge 411 and the second sub-bridge 412 is larger, and therefore, the electromagnetic interference between the first sub-bridge 411 and the second sub-bridge 412 in the energized state is better reduced.

Still referring to the plan view shown in FIG. 6, for example, the inflection point W5 is overlapped with the linear sub-edge 2312 of the third edge 231 of the third touch sub-electrode 230. Similarly, the inflection point W6 is overlapped with the corresponding linear sub-edge of the fourth edge of fourth touch sub-electrode 240 facing the connector 250. It can be understood that, the present example does not limit the positions of the inflection point W5 and the inflection point W6, and also does not limit the existence of the linear sub-edge t23 and the linear sub-edge t24. In another example, for example, the inflection point W5 is located on the side of the linear sub-edge 2312 of the third edge opposite to the connector 250, and the inflection point W6 is located on the side of the corresponding linear sub-edge of the fourth edge opposite to the connector 250. In another example, for example, the second edge t2 of the first sub-bridge 411 does not include the linear sub-edge t23 and the linear sub-edge t24, accordingly, the third linear sub-edge t21 and the linear edge t3 in FIG. 6 directly extend and intersect each other, and the fourth linear sub-edge t22 and the liner edge t4 directly extend and intersect each other. Here, the linear edge t3 and the linear edge t4 are, for example, two linear edges on opposite sides of the first sub-bridge 411 connecting the first edge t1 and the second edge t2.

Still referring to FIG. 2, the third included angle α3 between the first linear sub-edge t12 and the linear sub-edge 2312 and the fourth included angle α4 between the third linear sub-edge t21 and the fifth linear sub-edge 2312 are in a range of greater than or equal to 70° and less than 110°. Preferably, both the third included angle α3 and the fourth included angle α4 are 90°. In this way, on the one hand, being parallel to the edge of pixel structure is avoided, and on the other hand, the maximum length b of the first and second sub-bridges in the second direction is prevented from being too large.

For example, the fifth included angle between the linear sub-edge 2312 and the linear sub-edge 2313 is in the range of greater than or equal to 130° and less than 180°.

For example, the sixth included angle between the linear sub-edge 2312 and the first direction x is in the range of greater than 0° and less than or equal to 25°.

The angle range of each of the first to sixth included angles can help to avoid periodic interference occurred between the respective touch sub-electrode and the respective sub-bridge and the pixel electrode, thereby reducing the visibility of the touch panel.

Still referring to FIG. 2, for example, the axis of symmetry of the first sub-bridge 411 is a first axis M1, and the axis of symmetry of the second sub-bridge 412 is a second axis M2. For example, both the first axis M1 and the second axis M2 are parallel to the first direction x.

In FIG. 2, for example, the first axis coincides with the second axis. However, the embodiments of the present disclosure are not limited thereto. In another example, the first axis M1 and the second axis M2 may be staggered by a certain distance in the second direction y.

In FIG. 2, for example, the first sub-bridge and the second sub-bridge are symmetrical with respect to the third axis M3.

The third axis is, for example, parallel to the second direction y. It is understood that, the embodiments of the present disclosure are not limited thereto. In another example, the first sub-bridge and the second sub-bridge may be asymmetric with respect to the second direction.

In FIG. 2, for example, the linear sub-edge 2311 and the linear sub-edge 2314 are symmetrical with respect to the third axis M3, and the linear sub-edge 2312 and the linear sub-edge 2313 are symmetrical with respect to the third axis M3. In addition, the fourth touch sub-electrode 240 has a fourth edge 241 facing the connector, and the third edge 231 and the fourth edge 241 are symmetrical with respect to the first axis M1, for example.

Still referring to the plane structure shown in FIG. 2, the connector 250 has a fifth edge 251 facing the third touch sub-electrode 230 and a sixth edge 252 facing the fourth touch sub-electrode 240. The fifth edge 251 and the sixth edge 252 are symmetrical with respect to the first axis M1, for example. Here, each of the third edge 231, the fourth edge 241, the fifth edge 251 and the sixth edge 252 has a broken line shape. For example, the fifth edge 251 is parallel to the third edge 231, and the sixth edge 252 is parallel to the fourth edge 241. Here, two broken line edges being parallel means that the distance between the two broken line edges facing each other at any position keeps substantially equal. The seventh edge t3 of the first sub-bridge 411 is connected to the first edge t1 and the second edge t2. Specifically, the seventh edge t3 of the first sub-bridge 411 is connected to the first linear sub-edge t11 and the third linear sub-edge t21. The seventh edge t3 is overlapped with the third touch sub-electrode 230. For example, the seventh edge t3 is a straight line and perpendicular to the first linear sub-edge t11 and the third linear sub-edge t21.

Referring to FIG. 2, for example, the ratio of the maximum length b of the first sub-bridge 411 in the second direction y to the minimum length a of the connector 250 in the second direction y is between 2.75 and 3.25. Preferably, b=3a. In this way, it is not only advantage for optically reducing the visibility of the bridge, but also advantage for meeting the requirements of the process yield.

In the plane structure shown in FIG. 2, for example, the length s1 of the first linear sub-edge t11 of the first sub-bridge 411, the length f of the seventh edge t3 of the first sub-bridge 411, the maximum length b of the first sub-bridge 411 in the second direction y, the second included angle $\alpha 2$, and the sixth included angle $\alpha 6$ satisfy the following equation:

$$s1 + f \tan \alpha 6 = (b/2)/\sin(\alpha 2/2)$$

Figure 7:
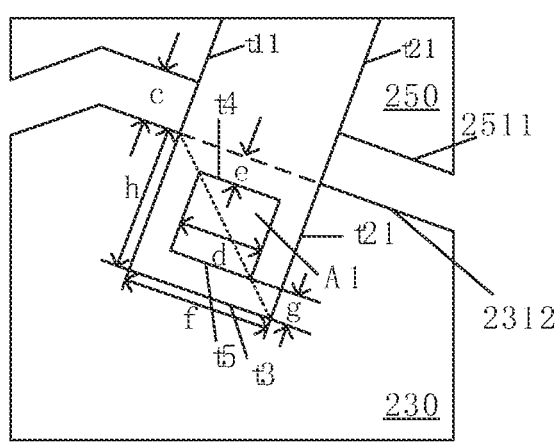
FIG. 7 is a schematic view of an enlarged plane structure at the dotted box in FIG. 2 of a touch panel provided by the embodiments of the present disclosure.

FIG. 7 is a schematic view of an enlarged plane structure at the dotted box in FIG. 2 of the touch panel provided by the embodiments of the present disclosure. Referring to FIG. 7, for example, the fifth edge 251 includes, for example, a seventh linear sub-edge 2511 parallel to the fifth linear sub-edge 2312. For example, the distance c between the fifth linear sub-edge 2312 and the seventh linear sub-edge 2511 is less than or equal to 20 μm. In this way, it may be advantage for improving the manufacturing yield of the touch panel.

The touch panel TA provided by the embodiments of the present disclosure further includes a conductive via A1 electrically connected to the first sub-bridge 411 and the third touch sub-electrode 230. In the plane structure shown in FIG. 7, the shape of the conductive via A1 is a rectangle, and the length d of either side of the rectangle is in a range of greater than or equal to 20 μm and less than or equal to 40 μm. It can be understood that, the embodiments of the present disclosure do not limit the plane shape of the conductive via. In another example, the conductive via A1 has a plane shape of square, and the length of the square is, for example, in a range of greater than or equal to 20 μm and less than or equal to 40 μm. Alternatively, in another example, the conductive via A1 has a plane shape of circle with a diameter d in a range of greater than or equal to 20 μm and less than or equal to 40 μm. In this way, it is advantage for achieving a good balance between reducing the impedance at the conductive via and reducing the visibility of the conductive via itself.

Still referring to FIG. 7, the first linear side t4 of the conductive via A1 facing the connector 250 is parallel to the fifth linear sub-edge 2312 of the third touch sub-electrode 230. For example, the distance e between the first linear side t4 and the fifth linear sub-edge 2312 is in a range of greater than or equal to 5 μm and less than or equal to 10 μm.

For example, the second linear side t5 of the conductive via V1 away from the connector 250 is parallel to the seventh edge t3. For example, the distance g between the second linear side t5 and the seventh edge t3 is in a range of greater than or equal to 5 μm and less than or equal to 10 μm.

For example, the seventh edge t3 of the first sub-bridge 411 is parallel to the fifth linear sub-edge 2312. For example, the distance h between the seventh edge t3 and the fifth linear sub-edge 2312 is in a range of greater than or equal to 30 μm and less than or equal to 60 μm.

For example, the distance h between the seventh edge t3 and the fifth linear sub-edge 2312, the length d of the side of the conductive via, and the spacing c between the fifth linear sub-edge 2312 and the seventh linear sub-edge 2511 satisfy the following equation:

$$d \leq c + h \leq 2d$$

For example, the first linear sub-edge t11 of the first sub-bridge 411 is parallel to the third linear sub-edge 121, and the distance f between the first linear sub-edge t11 and the third linear sub-edge t21 is in a range of greater than or equal to 30 μm and less than or equal to 60 μm.

In one example of the embodiments of the present disclosure, in the plane structure, the diagonal of the overlapping parts of the first sub-bridge 411 and the third touch sub-electrode 230 coincides with the diagonal of the conductive via A1, which is shown as the dotted line in FIG. 7. However, the embodiments of the present disclosure are not limited thereto. In another example, the diagonal of the overlapping parts of the first sub-bridge 411 and the third touch sub-electrode 230 may also be parallel to the diagonal of the conductive via A1. In this way, it is advantage for reducing the visibility of the sub-bridge and the conductive via, that is, the visibility problem of the sub-bridge and the conductive via are reduced or eliminated. Although the overlapping pans of the first sub-bridge 411 and the third touch sub-electrode 230 have a plane shape of rectangle in the example shown in FIG. 7, the embodiments of the disclosure are not limited thereto. In another example, the overlapping parts of the first sub-bridge 411 and the third touch sub-electrode 230 may have other polygonal shapes, such as trapezoidal shape, for example.

It is understood that, the numerical and geometric relationships between the respective edge portions and the associated angles are described above with respect to the embodiments shown in FIG. 2 and FIG. 7. However, these numerical and geometric relationships may also be applied to other embodiments of the present disclosure under the circumstance without conflict.

Still referring to the planar structure shown in FIG. 2, the touch panel TA further includes at least two parallel strip-shaped auxiliary electrodes between each adjacent two of the first touch sub-electrode 210, the second touch sub-electrode 220, the third touch sub-electrode 230 and the fourth touch sub-electrode 240. In this way, the distance between two adjacent touch sub-electrodes is increased, the mutual capacitance substrate is reduced, the driving load of the third touch sub-electrode and the fourth touch sub-electrode is reduced, and the power consumption is reduced. In addition, due to the insertion of the auxiliary electrodes, the relative size between (the third touch sub-electrode and the fourth touch sub-electrode) and (the first touch sub-electrode and the second touch sub-electrode) is compressed, while the self-capacitance substrate is reduced, which is also advantage for reducing the driving load of the first touch sub-electrode and the second touch sub-electrode. In addition, the insertion of the auxiliary electrodes can also reduce the possibility of short between the third touch sub-electrode and the fourth touch sub-electrode, and the first touch sub-electrode and the second touch sub-electrode, thereby improving the manufacturing yield.

In the above embodiment, both the first edge t1 and the second edge t2 of the first sub-bridge 411 are broken lines, and the protruding directions of the first edge t1 and the second edge t2 are the same. The third edge of the third touch sub-electrode 230 facing the connector 250 is a broken line with three inflection points. It should be noted that, the embodiments of the present disclosure are not limited thereto.

Figure 8:
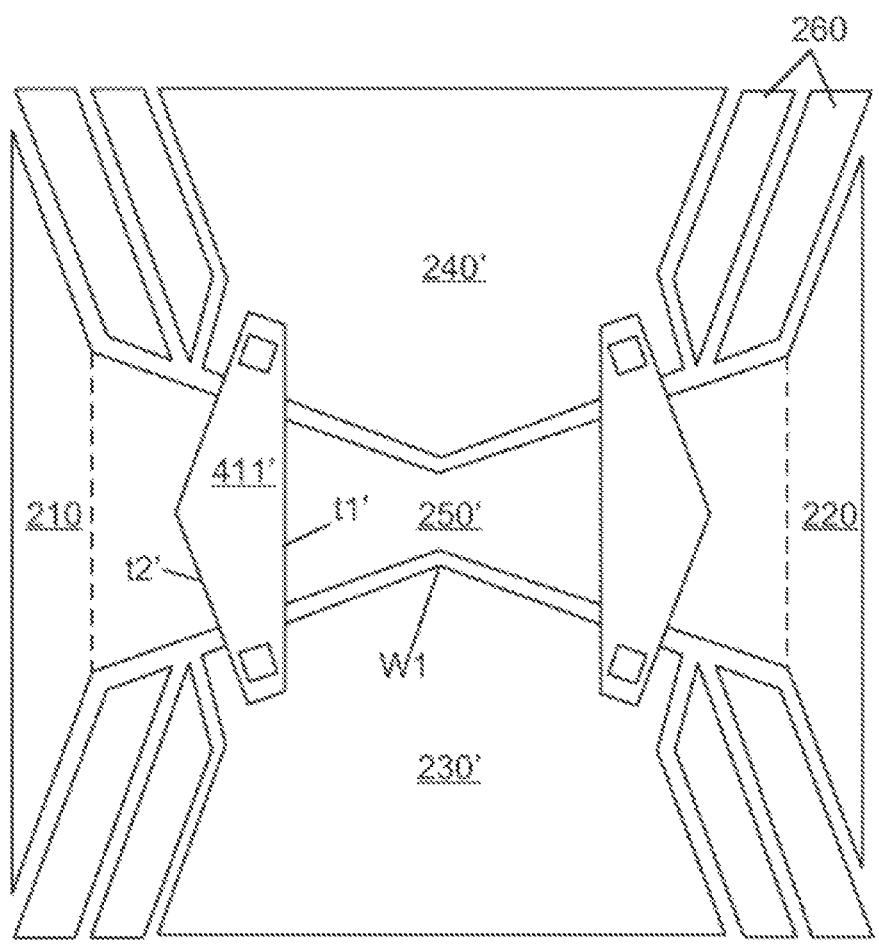
FIG. 8 is a schematic view of an enlarged plane structure corresponding to the dotted box in FIG. 1 of a touch panel provided by another embodiment of the present disclosure.

FIG. 8 is a schematic view of an enlarged plane structure corresponding to the dotted box in FIG. 1 of the touch panel provided by another embodiment of the present disclosure.

Referring to FIG. 8, in another embodiment, the first edge t1' of the first sub-bridge 411' is a straight line, for example, while the second edge t2' is a broken line. The third edge of the third touch sub-electrode 230' facing the connector 250' is a broken line with an inflection point W1.

Figure 9:
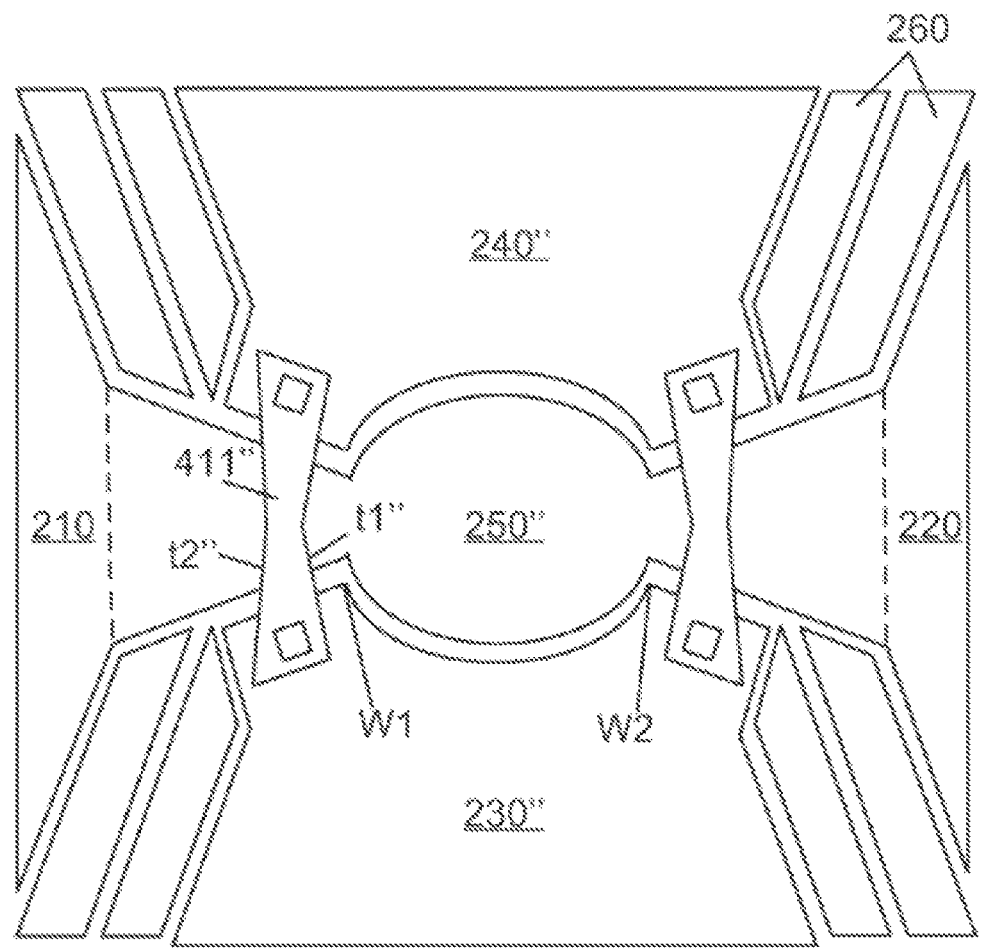
FIG. 9 is a schematic view of an enlarged plane structure corresponding to the dotted box in FIG. 1 of a touch panel provided by yet another embodiment of the present disclosure.

FIG. 9 is a schematic view of an enlarged plane structure corresponding to the dotted box in FIG. 1 of the touch panel provided by another embodiment of the present disclosure.

Referring to FIG. 9, in yet another embodiment, the protruding direction of the first edge t1" of the first sub-bridge 411" is opposite to the protruding direction of the second edge t2", for example. The third edge of the third touch sub-electrode 230" facing the connector 250" is a curved line with two inflection points (e.g., inflection points W1 and W2). The portion of the third edge between the inflection points W1 and W2 is, for example, a smooth curved line.

Figure 10:
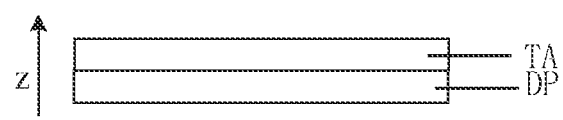
FIG. 10 is a schematic view of a cross-sectional structure of a touch display panel provided by the embodiments of the present disclosure.
Figure 11:
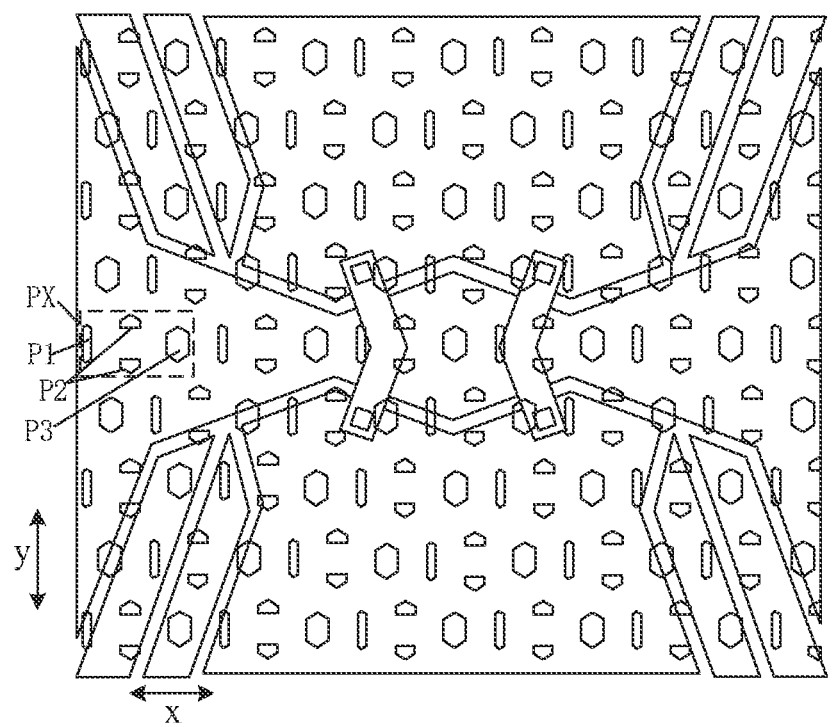
FIG. 11 is a schematic view of a plane structure of a touch display panel provided by the embodiments of the present disclosure.

FIG. 10 is a schematic view of a cross-sectional structure of a touch display panel provided by the embodiments of the present disclosure, and FIG. 11 is a schematic view of a plane structure of the touch display panel provided by the embodiments of the present disclosure.

Referring to FIG. 10 and FIG. 11, the embodiments of the present disclosure further provide a touch display panel, including the touch panel TA provided by any of the above embodiments and a display panel DP. The display panel DP includes a plurality of display pixel units PX arranged in a matrix in the first direction x and the second direction y.

Each display pixel unit PX includes, for example, at least three types of sub-pixels for displaying different colors. For example, referring to FIG. 11, the at least three types of sub-pixels for displaying different colors include a red sub-pixel P1 for displaying red, a green sub-pixel P2 for displaying green, and a blue sub-pixel P3 for displaying blue.

In the plan view shown in FIG. 11, both the plane structure of the pixel unit PX of the display panel DP and the plane structure of the touch panel shown in FIG. 2 are illustrated. It can be seen that, in the present embodiment, the linear edge of any sub-pixel is neither parallel nor perpendicular to the linear parts of the edges of the first and second sub-bridges. In this way, it is advantage for further reducing the visibility of the first and second sub-bridges.

Referring to FIG. 10, the light output direction of the display panel DP is, for example, the third direction z. The touch panel RA is located on the light output side of the display panel DP.

For example, the base substrate 100 in the touch panel TA is an encapsulation layer in the display panel DP.

Herein, the display panel DP is, for example, a flexible organic light-emitting display panel.

Further, the above-described touch display panel may be any product or component having touch display function, such as mobile phone, tablet computer, television, displayer, notebook computer, digital photo frame, navigator, etc.

The scope of the present disclosure is not limited by the embodiments described above, but by the accompanying claims and their equivalent scope.

What is claimed is:

1. A touch panel, comprising:
   a base substrate, having a main surface;
   a first touch sub-electrode, a connector and a second touch sub-electrode sequentially arranged on the main surface along a first direction, wherein the connector is electrically connected to the first touch sub-electrode and the second touch sub-electrode; and
   a third touch sub-electrode, a fourth touch sub-electrode and a bridge all on the main surface, wherein the third touch sub-electrode and the fourth touch sub-electrode are located on opposite sides of the connector in a second direction intersecting the first direction; the bridge and the connector are partially overlapped with each other and insulated from each other, the bridge is electrically connected to the third touch sub-electrode and the fourth touch sub-electrode, the bridge comprises a first sub-bridge and a second sub-bridge, and each of the first sub-bridge and the second sub-bridge is electrically connected to the third touch sub-electrode and the fourth touch sub-electrode,
   wherein in a plane structure of the touch panel parallel to the main surface, the first sub-bridge has a first edge and a second edge opposite to and spaced apart from each other, the first edge comprises a first linear sub-edge and a second linear sub-edge directly connected to each other, the second edge comprises a third linear sub-edge and a fourth linear sub-edge directly connected to each other; the first linear sub-edge and the third linear sub-edge are partially overlapped with the third touch sub-electrode, the second linear sub-edge and the fourth linear sub-edge are partially overlapped with the fourth touch sub-electrode, an included angle between the first linear sub-edge and the second linear sub-edge is a first included angle $\alpha 1$, an included angle between the third linear sub-edge and the fourth linear sub-edge is a second included angle $\alpha 2$, and at least one of the first included angle $\alpha 1$ and the second included angle $\alpha 2$ is an obtuse angle.

2. The touch panel according to claim 1, wherein the first included angle α1 and the second included angle α2 are in a range of greater than or equal to 90° and less than 160°.

3. The touch panel according to claim 1, wherein the third touch sub-electrode has a third edge facing the connector; each of the first sub-bridge and the second sub-bridge is partially overlapped with the third edge, and the third edge comprises a first inflection point, a second inflection point, and a fifth linear sub-edge connected to the first inflection point and a sixth linear sub-edge connected to the second inflection point, wherein the fifth linear sub-edge is not parallel to the sixth linear sub-edge.

4. The touch panel according to claim 3, wherein the first linear sub-edge and the third linear sub-edge of the first sub-bridge intersect the third edge,
and on the third edge, the third linear sub-edge is farther away from the first inflection point than the first linear sub-edge.

5. The touch panel according to claim 4, wherein on the third edge, the first sub-bridge and the second sub-bridge are partially overlapped with the third edge between the first inflection point and the second inflection point.

6. The touch panel according to claim 5, wherein the third edge further comprises a third inflection point,
on the third edge, the third inflection point is located between the first inflection point and the second inflection point, the first sub-bridge is overlapped with the third edge between the first inflection point and the third inflection point, and the second sub-bridge is overlapped with the third edge between the second inflection point and the third inflection point;
in the second direction, the third inflection point is farther away from the fourth touch sub-electrode than the first inflection point and the second inflection point;
a distance from the first inflection point to the third linear sub-edge is less than a distance from the third inflection point to the third linear sub-edge.

7. The touch panel according to claim 4, wherein
the first sub-bridge is partially overlapped with the third edge on a side of the first inflection point away from the second inflection point, and the second sub-bridge is partially overlapped with the third edge on a side of the second inflection point away from the first inflection point.

8. The touch panel according to claim 3, wherein
in the plane structure, the first sub-bridge intersects the fifth linear sub-edge, the second sub-bridge intersects the sixth linear sub-edge, and a third included angle α3 between the first linear sub-edge and the fifth linear sub-edge and a fourth included angle α4 between the third linear sub-edge and the fifth linear sub-edge are in a range of greater than or equal to 70° and less than 110°.

9. The touch panel according to claim 8, wherein the fifth linear sub-edge and the sixth linear sub-edge intersect at a third inflection point between the first inflection point and the second inflection point, the fifth linear sub-edge is connected to the first inflection point and the third inflection point, the sixth linear sub-edge is connected to the second inflection point and the third inflection point, the first linear sub-edge and the third linear sub-edge intersect the fifth linear sub-edge,
and in the second direction, the third inflection point is farther away from the fourth touch sub-electrode than the first inflection point and the second inflection point.

10. The touch panel according to claim 9, wherein a fifth included angle α5 between the fifth linear sub-edge and the sixth linear sub-edge is in a range of greater than or equal to 130° and less than 180°, and a sixth included angle α6 between the fifth linear sub-edge and the first direction is in a range of greater than 0° and less than or equal to 25°.

11. The touch panel according to claim 8, wherein on the third edge, the fifth linear sub-edge is located on a side of the first inflection point away from the second inflection point, and the sixth linear sub-edge is located on a side of the second inflection point away from the first inflection point.

12. The touch panel according to claim 5, wherein the first sub-bridge has a shape protruding towards the second sub-bridge, and the second sub-bridge has a shape protruding towards the first sub-bridge.

13. The touch panel according to claim 7, wherein the first sub-bridge has a shape protruding away from the second sub-bridge, and the second sub-bridge has a shape protruding away from the first sub-bridge.

14. The touch panel according to claim 3, wherein
a seventh edge of the first sub-bridge is connected to the first linear sub-edge and the third linear sub-edge, the seventh edge is perpendicular to the first linear sub-edge and the third linear sub-edge,
and a length s1 of the first linear sub-edge, a length f of the seventh edge, a sixth included angle α6 between the fifth linear sub-edge and the first direction, a maximum length b of the first sub-bridge in the second direction, and the second included angle α2 satisfy:

$$s1 + f \cdot \tan\alpha6 = (b/2)/\sin(\alpha2/2).$$

15. The touch panel according to claim 1, wherein a ratio of a maximum length b of the first sub-bridge in the second direction to a minimum length a of the connector in the second direction is between 2.75 and 3.25.

16. The touch panel according to claim 3, further comprising a conductive via electrically connected to the first sub-bridge and the third touch sub-electrode, in the plane structure, a shape of the conductive via is a rectangle, and the connector has a fifth edge facing the third touch sub-electrode and a sixth edge facing the fourth touch sub-electrode,
wherein the fifth edge comprises a seventh linear sub-edge parallel to the fifth linear sub-edge, a seventh edge of the first sub-bridge is connected to the first linear sub-edge and the third linear sub-edge,
and a distance c between the fifth linear sub-edge and the seventh linear sub-edge, a distance h between the seventh edge and the fifth linear sub-edge and a length d of either side of the rectangle satisfy: d≤c+h≤2d.

17. The touch panel according to claim 16, wherein in the plane structure, a diagonal of a part of the first sub-bridge overlapping with the third touch sub-electrode coincides with or is parallel to a diagonal of the conductive via.

18. The touch panel according to claim 1, wherein the touch panel further comprises two parallel strip-shaped auxiliary electrodes between each adjacent two of the first touch sub-electrode, the second touch sub-electrode, the third touch sub-electrode and the fourth touch sub-electrode.

19. A touch display panel, comprising a display panel and the touch panel according to claim 1, wherein the display panel is located on a side of the base substrate opposite to the main surface.

20. The touch display panel according to claim 19, wherein the display panel comprises a plurality of display pixel units arranged in a matrix in the first direction and the second direction, each of the plurality of display pixel units comprises sub-pixels for displaying different colors, and a linear edge of any one of the sub-pixels is neither parallel nor perpendicular to linear parts of edges of the first sub-bridge and the second sub-bridge.

\* \* \* \* \*